United States Patent [19]
Barkan et al.

[11] 3,873,887
[45] Mar. 25, 1975

[54] ALTERNATING-CURRENT POWER DELIVERY SYSTEM

[75] Inventors: Philip Barkan; Thomas H. Lee, both of Media, Pa.

[73] Assignee: General Electric Company, New York, N.Y.

[22] Filed: Mar. 18, 1974

[21] Appl. No.: 452,486

[52] U.S. Cl. .................... 317/20, 317/25, 317/26
[51] Int. Cl. ............................................ H02h 3/08
[58] Field of Search ............ 317/22, 23, 25, 26, 27, 317/28, 29, 20

[56] References Cited
UNITED STATES PATENTS
| | | | |
|---|---|---|---|
| 1,997,634 | 4/1935 | Evans et al. | 317/25 |
| 3,529,210 | 9/1970 | Ito et al. | 317/20 |
| 3,673,455 | 6/1972 | Dewey | 317/29 |

*Primary Examiner*—James D. Trammell
*Attorney, Agent, or Firm*—J. Wesley Haubner; William Freedman

[57] ABSTRACT

A power delivery system comprises a main circuit controller and a plurality of branch circuits that are in parallel with each other and in series with the main circuit controller. Each branch circuit has its own branch circuit breaker that can be opened to disconnect the associated branch from the remainder of the system. The main circuit controller comprises normally-conducting, current-limiting interrupting means and a resistor shunting said interrupting means. Means responsive to fault current through said main circuit controller and any one of said branch circuit breakers causes the interrupting means to operate with a current-limiting action that diverts the main circuit-controller current from the interrupting means into the shunting resistor. Means responsive to said fault current causes said one branch circuit to open while the main circuit-controller current is following a path through the shunting resistor. The interrupting means of the main circuit controller is reclosed immediately after the branch circuit breaker opens and interrupts the current therethrough. The resistor has an impedance no higher than about 18 percent of normal load impedance but sufficiently high to limit fault current therethrough under short circuit conditions to a value such that the current through any of said branch circuit breakers is within the maximum current-interrupting capacity of the branch circuit breaker.

8 Claims, 2 Drawing Figures

ALTERNATING-CURRENT POWER DELIVERY SYSTEM

This invention relates to an alternating-current power delivery system of the type in which: (1) a main circuit controller controls the flow of current from a source through a plurality of branch circuits that are in parallel with each other and in series with the main circuit controller, and (2) each branch circuit has its own normally closed branch circuit breaker which can be opened to disconnect the associated branch from the remainder of the system.

References of interest are: U.S. Pat. Nos. 3,219,883-Barkan; 3,515,829-Hurtle, et al.; 3,708,638-Mitchell; and 3,430,016-Hurtle, all assigned to the assignee of the present invention, and U.S. Pat. Nos. 1,689,515-Anderson; 1,796,817-Walty; 2,323,418-Pearson 2,620,382-Van Ryan; 2,866,045-Leeds; and 2,962,570-Thommen. Also of interest is IEEE Conference Paper C 73 407-2 by Falcone, et al., entitled "Current-Limiting Device — A Utility's Need," presented at the IEEE Power Engineering Society Summer Power Meeting in 1973 in Vancouver, Canada.

If a fault should develop on one of the branch circuits of a system such as referred to above, it is desirable to isolate this particular branch circuit from the remainder of the system and to continue service on the remainder of the system with a minimum of service interruption due to the fault. This goal can be realized in a selectively-coordinated system, but not without its price since such systems require that each of the branch breakers be capable of carrying and interrupting the prospective current of the system at the site of the branch circuit. To meet these high current-carrying and current-interrupting requirements, each of the branch breakers in a selectively-coordinated system must be of a rugged and relatively expensive construction.

To reduce the interrupting and current-carrying duty imposed on the branch circuit breakers, it has been proposed in U.S. Pat. No. 3,219,883-Barkan, assigned to the assignee of the present invention, that the main circuit controller be constructed as a current-limiting circuit breaker that is capable of opening in response to a fault on any one of the branches with a current-limiting action that limits the peak current allowed through the main circuit controller to a value substantially below the peak of the prospective current of the system at the main circuit controller. In referring to the prospective current of the system at a given point in the circuit, applicant is using this terminology in the sense defined in the American National Standard Definitions for Power Switchgear, Publication ANSI C 37-100-1972, pages 8 and 9, published in 1972 by the Institute of Electrical and Electronic Engineers, New York, N. Y. In the system of the Barkan patent, the branch circuit breaker opens after the main circuit breaker has opened and while the main circuit controller is still open, thus completely relieving the branch circuit breaker of interrupting any current from the source side of the main circuit breaker. Immediately after the branch circuit breaker has opened, Barkan's main circuit breaker is reclosed to restore service through any still-closed branch circuit breaker to the sound portion of the system.

A disadvantage of the Barkan system is that power is essentially completely interrupted to the sound portion of the system during the entire period that the main circuit breaker is open inasmuch as Barkan's current-limiting main circuit breaker, upon opening, completely interrupts the current therethrough from the system source. Admittedly, a portion of this power interruption period would be present even if there were no opening of the main circuit breaker since power is effectively interrupted so long as the fault remains on the power system and is not cleared by the appropriate branch circuit breaker. But it would be highly desirable to limit the duration of the power interruption to a period no greater than that required by the appropriate branch circuit breaker to clear the fault.

SUMMARY

Accordingly, an object of our invention is to provide a power delivery system of the general type disclosed in the Barkan patent in which the duration of the power interruption on the sound part of the system that results from a fault on a branch circuit is limited to a period not significantly greater than that required by the branch circuit breaker to clear the fault.

Another object is to prevent any significant power interruption should there be a false tripping of the main circuit controller in such a system.

Another object is to respond to a fault on a branch circuit by inserting into the main circuit supplying said branch circuit a resistance which has a high enough impedance to limit the current through the branch circuit breaker to a value within the current-interrupting capacity of the branch circuit breaker but which has a sufficiently low impedance to prevent an excessive voltage drop across the resistance.

In carrying out the invention in one form, we provide a power delivery system comprising a main circuit controller that comprises normally-conducting, current-limiting interrupting means and a resistor shunting the interrupting means when the interrupting means operates to interrupt the current therethrough. The system also comprises a plurality of branch circuit breakers connected in parallel with each other and in series with the main circuit controller. Means responsive to the flow of fault current through the main circuit controller and any one of said branch circuit breakers is provided for causing the interrupting means to operate with a current-limiting action that: (1) limits the peak let-through current through said interrupting means to a value substantially below the peak of the prospective current of said system at the point of said main circuit controller, and (2) forces the main circuit-controller current to follow a path through said shunting resistor. Means responsive to the fault current normally causes the one branch circuit breaker through which the fault current flows to open within several cycles after the inception of fault current and while the main circuit-controller current is following a path through said shunting resistor. Means is provided for reclosing said main circuit-controller interrupting means immediately after said one branch circuit breaker opens and interrupts the current therethrough. Each of the branch circuit breakers has a maximum current-interrupting capacity substantially lower than the prospective current of the system at the site of the branch circuit breaker, but the resistor has a sufficiently high impedance to limit the fault current through any branch circuit breaker under short circuit conditions to a value within the maximum current-interrupting capacity of said branch circuit breaker. The resistor is selected so that its impedance is no higher than about 18 percent of normal load impedance.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMEMTS

Figure 1:
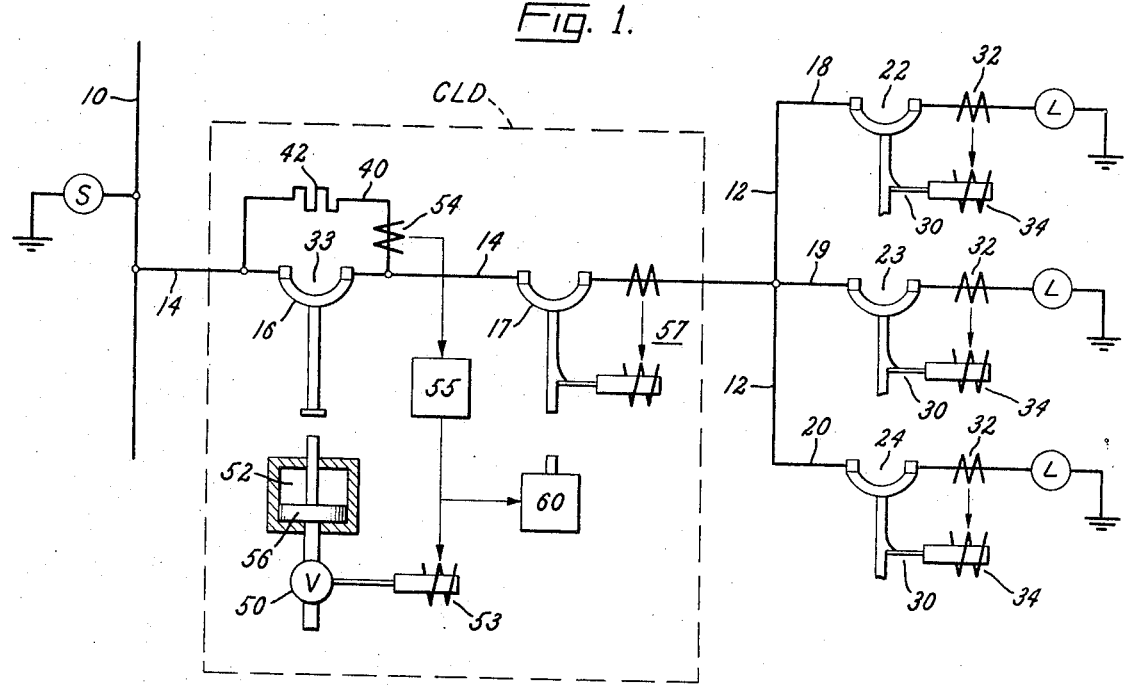
FIG. 1 is a one-line circuit diagram illustrating an electric power delivery system embodying one form of the invention.

Referring now to the one-line diagram of FIG. 1, there is shown an alternating-current power delivery system for delivering power from a source S to a plurality of loads L. The power delivery system comprises a main bus 10, a secondary bus 12, and a tie bus 14 interconnecting the main bus and the secondary bus. A main circuit controller 16 and an auxiliary circuit breaker 17 are connected in series with each other in the tie line 14. The main circuit controller 16 and the auxiliary circuit breaker 17 taken together are sometimes referred to hereinafter as a currentlimiting device CLD.

Connected to the secondary bus 12 are a plurality of branch circuits 18, 19, and 20 for delivering power from the secondary bus to the loads L. These branch circuits are respectively connected to the secondary bus through conventional normally-closed circuit breakers 22, 23, and 24, respectively. The branch circuit breakers may be thought of as connected in parallel with each other and in series with the main circuit controller 16 and the auxiliary circuit breaker 17.

Each of the branch circuit breakers is a low-capacity circuit breaker of a conventional type that includes current-responsive means for automatically opening the branch circuit breaker in response to an overcurrent in the branch circuit. In the illustrated embodiment, each branch circuit breaker is depicted as comprising separable contacts suitably biased toward open position and normally held closed by a conventional trip latch 30. The trip latch is operated in response to overcurrents in a conventional manner, as by a current transformer 32 coupled to the associated branch and a tripping solenoid 34 suitably operated in response to a signal from the current transformer indicative of an overcurrent. Since this overcurrent sensitive tripping arrangement is of a conventional design, it is shown in diagramatic form only. The trip latch 30 is operated within several cycles after the inception of a fault on the branch circuit. Typically, each of the branch circuit breakers is capable of completing its interrupting operation within three or four cycles after fault inception.

The main circuit controller 16 is a much quicker acting device than the branch circuit breakers 22, 23, and 24 and is capable of separating its contacts and interrupting the flow of current through its contacts within a fraction of a half cycle after the inception of a fault. One example of a circuit breaker capable of performing in this manner is illustrated and claimed in the aforesaid Barkan U.S. Pat. No. 3,219,883. Another example is shown and claimed in the aforesaid Hurtle, et al. U.S. Pat. No. 3,515,829. If the circuit controller 16 is one that is tripped open by an overcurrent relay, the relay of U.S. pat. No. 3,673,455-Dewey can be used for providing the desired quick response. The portion of the main circuit controller 16 in which such interruption is effected between the two contacts of the controller is referred herein to as the interrupter 33 of the circuit controller.

Figure 2:
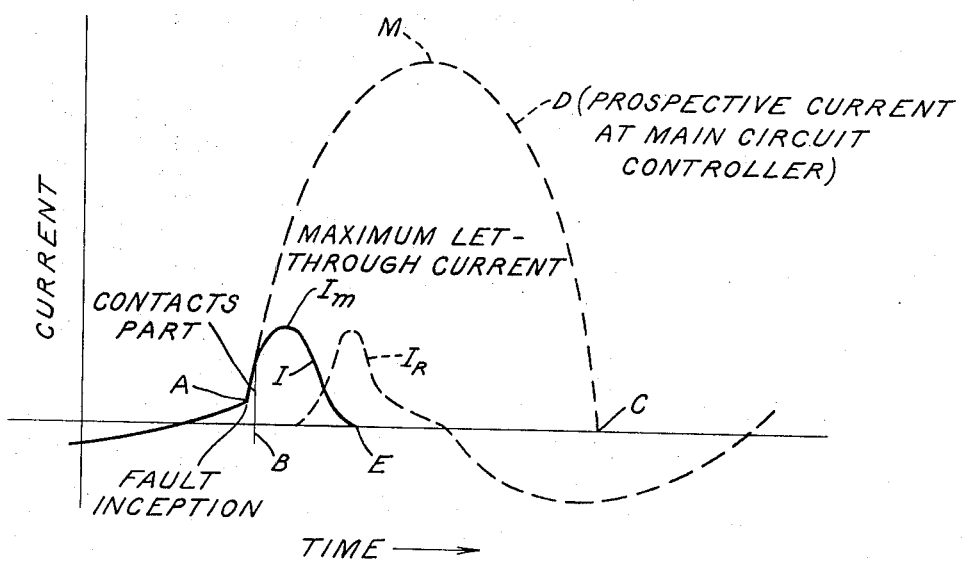
FIG. 2 is a graphic representation of the current-limiting action which takes place in the main circuit breaker of FIG. 1.

As in the above Barkan and Hurtle, et al., patents, the main circuit controller 16 has the additional capability of opening its contacts with a current-limiting action that limits the peak current allowed through the main circuit controller to a value substantially below the peak value of the prospective current of the system at the point of the main circuit controller. This capability is illustrated in FIG. 2, where the prospective current is depicted in dotted lines D, and the actual current is depicted in solid lines I. When a fault occurs at a point A, the current flowing through the controller will increase extremely rapidly toward a peak value M of the prospective current that may be hundreds of times greater than the normal continuous current through the controller. As is explained in the Barkan and Hurtle, et al., patents, the controller will part its contacts in response to this sudden rise in current at a point B and will immediately begin developing an arc voltage that limits the actual current to a maximum let-through value $I_M$ that is considerably less than the peak value M of the prospective current depicted by the dotted line curve D. The current through the contacts is thereafter driven down to zero considerably ahead of the natural current zero occurring at point C.

In out main circuit controller, we do not completely interrupt the current through the main circuit controller during the above-described current-limiting operation, but rather we divert this circuit-controller current into a resistive path 40 that shunts the circuit-controller contacts. This path 40 has an impedance, represented by resistor 42, that is of a relatively low value, typically only about 3 to 18% of the normal load impedance. The normal load impedance may be defined as the ratio of $V_L/I_C$, where $V_L$ is the rms line-to-ground voltage of the system in volts and $I_C$ is the rated continuous current of the system in rms amperes. The resistance 42 is selected to provide an impedance at least high enough to limit the current through any downstream breaker (i.e., breakers 17, 22, 23, and 24) under fault conditions to a value less than the maximum rated current-interrupting capacity of the downstream breaker. The maximum impedance of the resistor 42 is not critical but is determined by the minimum voltage that can be tolerated on the secondary bus 12 while the resistor 42 is connected in the tie line and there is no fault on the system. Typically, this will be about 85% of normal voltage. Thus, the maximum voltage drop across the resistor should be about 15% of line-to-ground voltage. Or stated otherwise, the impedance of resistor 42 should be no higher than about 18% of normal load impedance. For a system employing conventionally applied downstream circuit breakers, the preferred range of impedance for resistor 42 is about 5 to 10% of normal load impedance.

With a resistor of this impedance in series circuit with it, the branch circuit breaker at the head of the faulted branch can readily interrupt the current therethrough since, as stated above, the resistor limits the branch current to a value within the maximum current-interrupting capability of the branch circuit breaker. The maximum current-interrupting capability of the branch circuit breaker is substantially below the prospective current of the system at the branch circuit breaker.

The high arc voltage developed by the main circuit controller 16 quickly diverts current into the resistor 42 as indicated by the dot-dash line curve $I_R$ in FIG. 2. This diversion is complete by the time E when the current through the contacts has been forced to zero. After such diversion, the resistor 42 continues to conduct but limits the current flowing into the faulted branch sufficiently to enable the associated branch circuit breaker to successfully complete its interrupting operation. As soon as the branch circuit breaker completes its interruption and without any further action, nearly full service voltage is restored to all the sound branch circuits. The voltage then present on the branch circuits is reduced from normal only by the relatively small voltage drop that occurs across resistor 42.

The voltage on secondary bus 12 is quickly restored from its above-described reduced level to normal by reclosing the contacts of the interrupter 33 immediately following clearance of the fault by the branch circuit breaker. Such reclosing is accomplished by opening a normally-closed closing-control valve 50, thereby actuating a closing operator 52 for the interrupter. The illustrated closing operator is shown as a fluid-actuated operator containing a piston 56 vertically movable within a surrounding cylinder. In the schematic illustration of FIG. 1, the closing-control valve 50 is operated by a solenoid 53, which is controlled by a current-sensitive operator 54, 55. In response to the drop below a predetermined level of the current through resistor 42 which follows clearance of the fault by the appropriate branch circuit breaker, the current-sensitive operator 54, 55 actuates solenoid 53 thus operating the closing operator 52. The illustrated current-sensitive operator 54, 55 comprises a current transformer 54 coupled to resistive bypass circuit 40 for sensing the current in the resistive bypass circuit and suitable level-sensing and power supply means 55 which supplies power to solenoid 53 in response to a predetermined drop in current through resistive bypass circuit 40, as indicated by current transformer 34. The circuitry of current-sensitive operator 54, 55 can be of a suitable conventional design (e.g., a design similar to the undercurrent sensing means 25–29 of U.S. Pat. No. 2,351,989-Marbury) and is therefore not specifically illustrated. At the end of the above-described reclosing operation, the contacts of the circuit controller 16 are suitably releasably held in closed position and the pressurized operating fluid is dumped from the operator 52, all in a conventional manner.

If for some reason the branch circuit breaker is unsuccessful in interrupting the fault current flowing therethrough under the above-described fault conditions, it is necessary to interrupt the relatively high current then flowing through resistor 42 in order to prevent its causing damage to the various circuit components. The auxiliary circuit breaker 17 serves to provide such back-up protection. In one embodiment, this auxiliary circuit breaker is provided with current-responsive trip means 57 selectively coordinated with the trip means of the branch circuit breakers. This trip means 57 requires a slightly longer time to effect tripping in response to a given value of current than does the trip means for each of the branch circuit breakers. Should the fault current persist for a period longer than that normally needed for the branch circuit breaker to effect interruption, the current-responsive trip means 57 will effect tripping of auxiliary circuit breaker 17, thus interrupting the fault current. The auxiliary circuit breaker may also have a maximum current-interrupting capacity less than the prospective current of the system at the site of the auxiliary breaker since it opens under fault conditions only when the current therethrough is limited by resistor 42.

Some users will prefer to allow the main circuit controller 16 to remain open and not reclose automatically if the branch circuit breaker has been unsuccessful in clearing the fault on its branch and the auxiliary circuit breaker 17 has opened in response to this condition. In such cases, opening of the auxiliary circuit breaker will open a suitable lock-out switch (not shown) that prevents the closing operator 52 from receiving a closing signal until the lock-out switch is deliberately reset.

Other users will prefer to attempt reclosing even if the auxiliary circuit breaker 17 has opened as above described since there is still a reasonable likelihood that the fault will have been isolated by the branch circuit breaker or will have been otherwise removed. The current-sensitive operator 54, 55 withholds an operating signal from the circuit controller closing operator 50–53, as long as the current through resistive bypass circuit 40 is high enough to indicate that the fault remains on the branch circuit. But in this form of the invention, interruption of the fault current by auxiliary circuit breaker 17 allows the current-sensitive operator 54, 55 to initiate a reclosing operation of the main circuit controller 16. In this embodiment, auxiliary circuit breaker 17 also has a reclosing actuator 60 which, if the auxiliary circuit breaker is open, is capable of responding to the operating signal from current responsive operator 54, 55 to produce a reclosing operation of auxiliary breaker 17 at substantially the same time as the main circuit controller 16 recloses. When the two circuit controllers 16 and 17 are thus closed, service can be resumed over the sound portion of the system, assuming that the fault on the faulted branch remains isolated or has been otherwise removed.

An important advantage of our above-described equipment is that any false tripping of the main circuit controller normally would produce no significant interruption of service to the branch circuits. In this respect, such false tripping would divert current into resistor 42 within a fraction of a half cycle, but since current through the resistor would be low, the current-sensitive operator 54, 55 of the main circuit controller would initiate an immediate reclosing of the interrupter 33. None of the downstream circuit breakers would have opened since there would have been no overcurrent to cause any such opening. From a system voltage viewpoint, the only disturbance that would have occurred is that the voltage on the downstream side of resistor 42 would have been reduced by a relatively minor percentage during the brief period while the interrupter 33 was open.

Some other advantages of our above-described current-limiting device are: (1) it provides for increased generator stability as a result of its rapid insertion of resistance into the faulted circuit, (2) it substantially reduces fault-current damage to electrical apparatus in the system, including bus insulation, since it substantially limits the current and resultant electromagnetic forces during the crucial first half-cycle of fault current, and (3) it obviates the need for single-phase tripping. Still another advantage is that normal protective relaying can still be used in the system for controlling its conventional circuit breakers since opening of the main circuit controller 16 merely inserts the resistor 42 into the circuit, allowing the protective relaying to respond in its normal manner to the continuing, though less severe, overcurrent in the circuit.

Another advantage of our current limiting device is that after a full opening operation has taken place, the auxiliary circuit breaker 17 can be selectively closed prior to closing of the main circuit controller 16 to insert the resistor 42 in the energized circuit so as to provide circuit conditions well suited for testing the system insulation. In this regard, because only a relatively small voltage drop (e.g., 5 to 10% of the source voltage in one form of the invention) occurs across the resistor, most of the source voltage will be available on the secondary bus to test the insulation. Should a dielectric breakdown of the insulation occur, follow current will be limited by resistor 42, and the auxiliary breaker 17 can open to clear such limited follow current.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

We claim as our invention:

1. An alternating-current power delivery system comprising:
   a. a main circuit controller comprising current-limiting interrupting means for carrying the current through said controller when the controller is closed and a resistor shunting said interrupting means to provide a resistive conductive path shunting said interrupting means when the interrupting means operates to interrupt the current therethrough,
   b. a plurality of branch circuit breakers connected in parallel with each other and in series with said main circuit controller,
   c. each of said branch circuit breakers comprising relatively movable contacts that are separable to effect opening of the branch circuit breaker and each having a maximum current-interrupting capacity substantially lower than the prospective current of said system at the point in which said branch circuit breaker is connected,
   d. means responsive to the flow of fault current through said main circuit controller and any one of said branch circuit breakers for causing said interrupting means to operate with a current-limiting action that: (1) limits the peak let-through current through said interrupting means to a value substantially below the peak of the prospective current of said system at the point of said main circuit breaker and (2) diverts the main circuit-controller current from a path through said interrupting means into a path through said shunting resistor,
   e. means responsive to said fault current for normally causing the one branch circuit breaker through which said fault current flows to open within several cycles after the flow of fault current begins and while the main circuit-controller current is following a path through said shunting resistor,
   f. means for reclosing said main circuit-controller interrupting means immediately after said one branch circuit breaker opens and interrupts the current therethrough,
   g. and an additional normally-closed circuit breaker in series with said rsistor and said branch circuit breakers and operable in the event said one branch circuit breaker fails to interrupt for interrupting the current through said resistor,
   h. said resistor having an impedance no higher than about 18 percent of normal load impedance but sufficiently high to limit fault current through said branch circuit breakers and said additional circuit breaker under short circuit conditions to a value within the maximum current-interrupting capacity of said branch circuit breakers and said additional circuit breaker,
   i. said additional circuit breaker remaining closed during the period between opening and reclosing of said main circuit-controller interrupting means if said one branch circuit breaker is successful in interrupting the fault current therethrough.

2. The power delivery system of claim 1 in which said interrupting means of the main circuit controller comprises separable normally-closed contacts that are sepaiated in response to the flow of fault current through said main circuit controller to interrupt the current through said contacts.

3. The power delivery system of claim 1 in which the means for reclosing said main circuit-controller interrupting means operates to effect said reclosing in response to a drop in the current through said resistor indicative of interruption of said fault current by said one branch circuit breaker.

4. The system of claim 1 in which said additional circuit breaker is connected in series with said interrupting means and said resistor.

5. The system of claim 1 in which the impedance of said resistor is in the range of 3 to 18 percent of normal load impedance.

6. The system of claim 5 in which the impedance of said resistor is in the range of about 5 to 10 percent of normal load impedance.

7. The system of claim 1 in which said reclosing means operates to effect an immediate reclosing of said interrupting means if the current through said resistor upon opening of said interrupting means is in a range indicating that no fault is present on said system.

8. The system of claim 7 in which said additional circuit breaker remains closed during the period between opening and reclosing of said interrupting means if there is no fault present on said system while said interupting means is open.

* * * * *